United States Patent [19]
Hollnagel

[11] Patent Number: 5,718,463
[45] Date of Patent: Feb. 17, 1998

[54] TUBE QUICK CONNECT TO FEMALE SOCKET

[76] Inventor: Harold E. Hollnagel, 9479 N. Riverbend Ct., Milwaukee, Wis. 53217

[21] Appl. No.: 621,110

[22] Filed: Mar. 22, 1996

Related U.S. Application Data

[63] Continuation-in-part of Ser. No. 527,759, Sep. 13, 1995, abandoned.

[51] Int. Cl.⁶ ..................................................... F16L 39/00
[52] U.S. Cl. .......................... 285/319; 285/424; 285/921
[58] Field of Search ................................. 285/319, 921, 285/424, 320

[56] References Cited

U.S. PATENT DOCUMENTS

| | | |
|---|---|---|
| 3,245,703 | 4/1966 | Manly . |
| 3,711,125 | 1/1973 | Dehar ............................ 285/319 X |
| 3,826,523 | 7/1974 | Eschbaugh ..................... 285/319 X |
| 3,858,913 | 1/1975 | Gallagher . |
| 4,802,697 | 2/1989 | Bartholomew ................... 285/319 |
| 5,064,227 | 11/1991 | Spor et al. ..................... 285/921 X |
| 5,096,235 | 3/1992 | Oetiker .......................... 285/921 X |
| 5,112,084 | 5/1992 | Washizu ......................... 285/921 X |

*Primary Examiner*—Terry Lee Melius
*Assistant Examiner*—Heather Shackelford
*Attorney, Agent, or Firm*—Howard & Howard

[57] ABSTRACT

A quick connect member (36, 136, 236) for connecting a tube (12) in a female socket having a radially extending shoulder in a groove (28). The quick disconnect member (36, 136, 236) comprises an annular support portion (40, 140, 240) for retained on the tube (12) to slide therealong and a pair of cantilevered spring arms (42, 142, 242) extending axially from the support portion (40, 140, 240). An abutment (38, 138, 238) is disposed at the distal end of each arm (42, 142, 242) and is biased radially outwardly and into a locked position in overlapping engagement with the shoulder of the groove (28) to mechanically prevent removal of a projection (18) on the tube (12) from the socket (14). In the first embodiment, the quick connect member (36) is defined by a coil of wire coiled about the tube (12) to define the support portion (40) with the wire extending axially from the coil to define the arms (42) and then extends transversely into the arms (42) to define circular abutments (38). In the second embodiment, the quick connect member (136) is defined by sheet metal in a U-shape having a support portion (140) with an opening (148) therein for receiving the tube (12) therethrough. The third embodiment includes a tab (250) extending from each of the abutments (238) to the exterior of the socket for moving the abutments radially inwardly to clear the shoulder (28) for insertion and removal from the socket and each of the tabs (250) includes an undulation (252) biased into engagement with the shoulder (28) to urge the projection (18) axially into the socket.

22 Claims, 3 Drawing Sheets

TUBE QUICK CONNECT TO FEMALE SOCKET

RELATED APPLICATION

This application is a continuation-in-part of application Ser. No. 08/527,759 filed Sep. 13, 1995, now abandoned.

TECHNICAL FIELD

The subject invention relates to a quick connect assembly of the type for connecting a fluid conveying tube in a female socket in a member in fluid communication with the tube.

BACKGROUND OF THE INVENTION

The art of coupling or connecting a fluid tube to a female socket or receptacle is highly developed and therefore includes a wide variety of assemblies. There is, however, a constant need to simplify the assembly and the manufacturing time and expense. Snap together assemblies which are manually released or disconnected are well known. Examples of such assemblies are disclosed in U.S. Pat. Nos. 3,245,703 to Manly and 3,858,913 to Gallagher. But competition always leaves a need for simplicity in design and ease of manufacture.

SUMMARY OF THE INVENTION

A coupling assembly for connecting a tube to a socket comprising a socket member defining a female socket and a tube having an end disposed in the socket and presenting a radially extending projection with the socket member presenting a radially extending shoulder. The assembly is characterized by a quick disconnect member retained on the tube for sliding movement therealong and including an abutment biased radially outwardly into a locked position in overlapping engagement with the shoulder to abut the projection and prevent removal of the tube from the socket.

The invention is further characterized by a quick disconnect member for such an assembly wherein the quick disconnect member comprises an annular support portion for surrounding an axis and being retained on the tube to slide therealong and at least one arm extending transversely from the annular support portion for disposition axially along the tube to a distal end displaced axially from the annular support portion to an abutment disposed at the distal end and biased radially outwardly by the arm and into a locked position in overlapping engagement with the shoulder to mechanically prevent removal of the projection and the tube from the socket.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
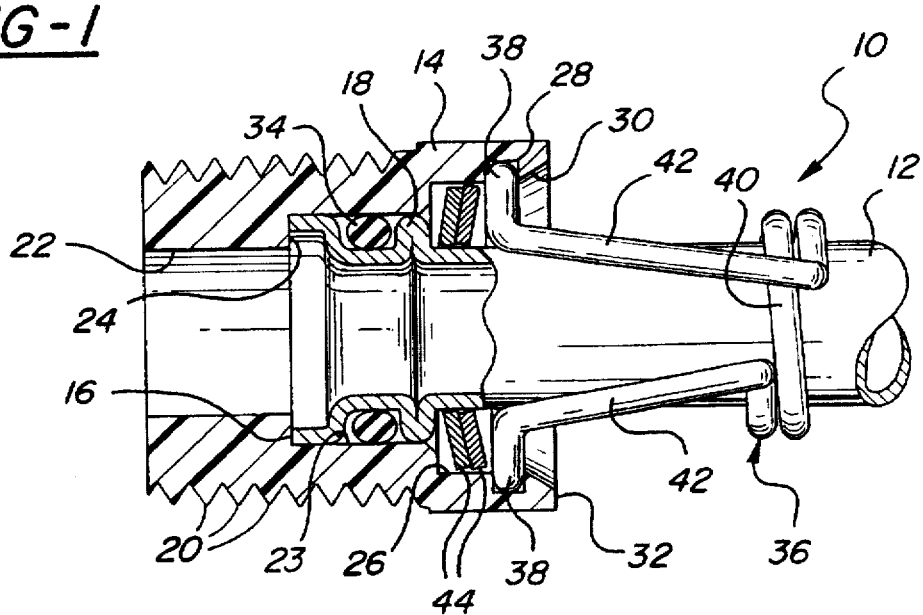
FIG. 1 is fragmentary cross sectional view of a preferred embodiment of the subject invention.
Figure 2:
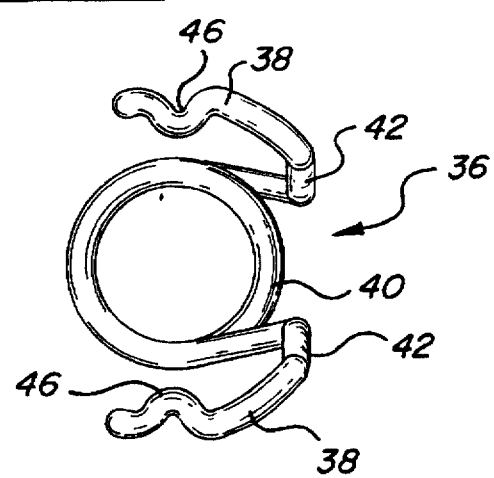
FIG. 2 is an end view of the first embodiment of the quick disconnect member of the subject invention.
Figure 3:
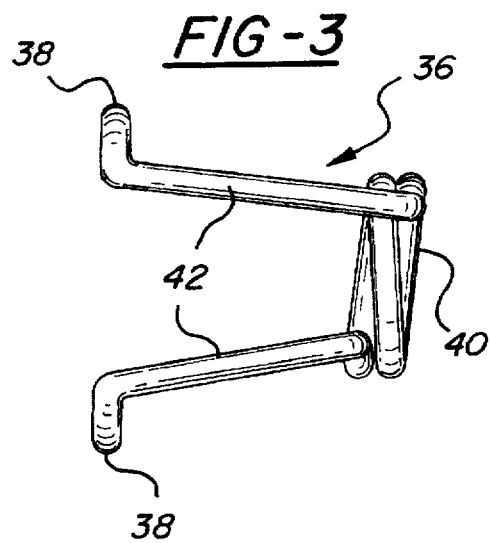
FIG. 3 is a side view of the member of FIG. 2.
Figure 6:
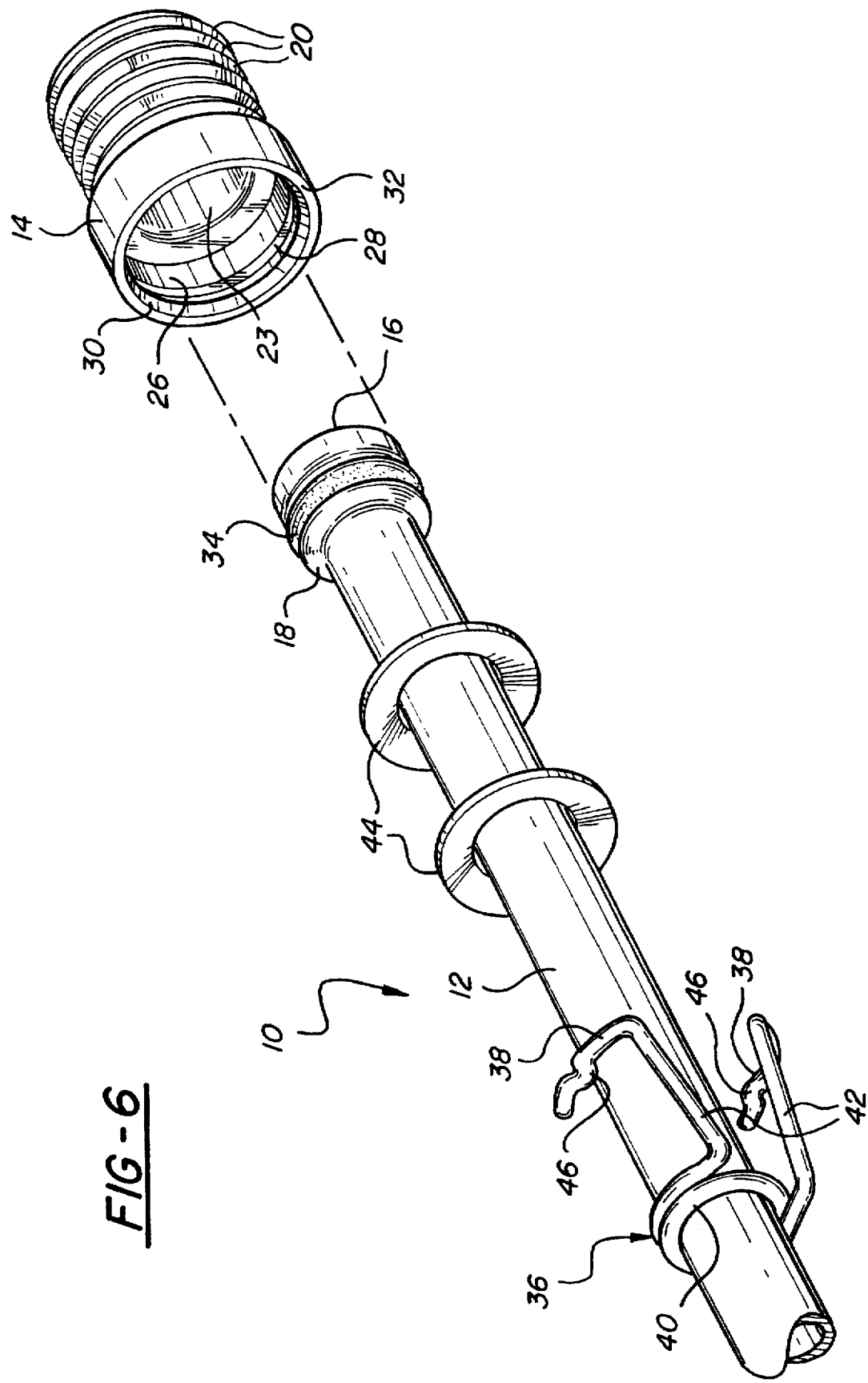
FIG. 6 is an exploded perspective view of the embodiment of FIGS. 1 through 3.
Figure 7:
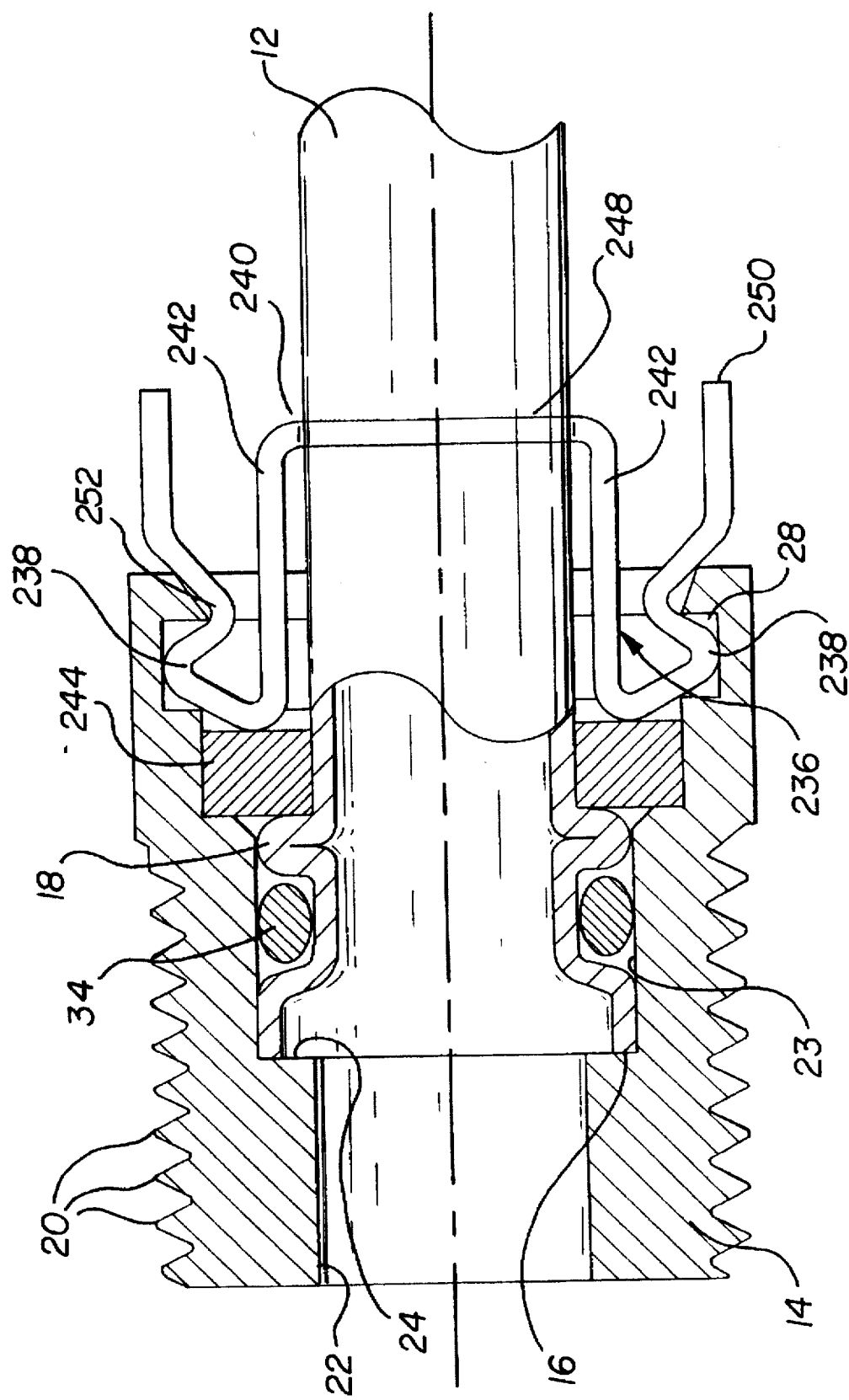
FIG. 7 is a cross sectional view of yet another embodiment of the subject invention.

Referring to the Figures, wherein numerals separated by one hundred reference like or corresponding parts throughout the several views, a coupling assembly is generally shown at 10 in FIGS. 1, 6 and 7. The coupling assembly 10 is useful for connecting a tube 12 to a socket member 14 defining a female socket.

The tube 12 has an end 16 disposed in the socket member 14 and presents a radially extending tube projection 18. The projection 18 is defined by a crimp or gathering in the tube 12 and which extends annularly about the axis of the tube 12.

The socket member 14 has external threads 20 for threadedly engaging a structure to be in fluid communication with an internal passage 22 and the tube 12. The socket member 14 also includes a tube counterbore 23 presenting a radial tube seat 24 and the end 16 of the tube 12 is seated against the tube seat 24. The socket member 14 further includes an entry counterbore 26 extending from the tube seat 24. The entry counterbore 26 presents a radially extending shoulder defined by an annular groove 28 in the entry counterbore 26 of the socket member 14. Alternatively, the shoulder could be defined by a snap ring retained in the socket member 14. A conical surface 30 extends between the front face 32 of the socket member 14 and the groove 28. Another conical surface extends between the tube seat 24 and the tube counterbore 23. The projection 18 is radially smaller than the tube counterbore 23 for allowing the projection 18 to move into the tube counterbore 23.

The end 16 of the tube 12 is enlarged a degree equal to the projection 18 to define a seal saddle therebetween. An O-ring seal 34 is disposed in the seal saddle snugly between the projection 18 and the enlarged end 16. The seal 34, therefore, extends annularly about the tube 14 between the projection 18 and the end 16 of the tube 12 for sealing the tube 12 in the socket.

Referring to the embodiment of FIGS. 1 through 3 and 6, the assembly 10 is characterized by a quick disconnect member, generally shown at 36, retained on the tube 12 for sliding movement therealong and including an abutment 38 biased radially outwardly into a locked position in overlapping engagement with the shoulder of the groove 28 to mechanically prevent removal of the projection 18 and the tube 12 from the socket 14. The quick disconnect member includes a support portion 40 surrounding the tube 12 outside the socket member 14 and in sliding engagement with the tube 12 and a pair of arms 42 extending axially along the tube 12 and into the socket member 14 to a distal end axially displaced from the support portion 40. The abutment 38 is disposed at the distal end of the arms 42 and within the socket member 14 with the support portion 40 disposed outside the socket member 14, i.e., the abutment 38 faces the support portion 40.

The arms 42 are cantilevered from the support portion 40 and are biased by being spring loaded to a neutral position in which they extend along and are flared outwardly from the axis of the tube 12. The abutments extend radially outwardly from the arms 42 and are disposed radially outwardly of the shoulder defined by the groove 28 when in the neutral position so that the support portion 40 may be moved along the tube 12 as the arms 42 and abutments 38 are moved radially inwardly toward the axis of the tube 12 to clear the shoulder of the groove 28 as the abutments 38 are moved axially into the entry counterbore 26 of the socket 14 whereupon the arms 42 are released to allow the abutments 38 to be biased into the overlapping engagement with the shoulder of the groove 28. The arms 42, being disposed outside the socket member 14, are accessible to reverse the process by being moved radially inwardly to clear the shoulder of the groove for removal.

Axial biasing means 44 are disposed between the projection 18 of the tube 12 and the abutments 38 for biasing the end 16 of the tube 12 against the tube seat 24. The axial biasing means 44 comprises a pair of Belleville-type washers. Accordingly, the annular groove 28 and the Belleville washers 44 of the axial biasing means are disposed along the entry counterbore 26. In low pressure situations, solid washers, resilient or rigid, could be used instead of the washers 44. In any case, the abutments 38 abut the projection 18 through the washers 44 and prevent removal of the tube 12 from the socket member 14.

Each of the abutments 38 presents a circular periphery complementary to the groove 28.

In the embodiment of FIGS. 1 through 3 and 6, the quick connect member 36 is defined by a coil of wire coiled approximately one and three quarters turns about the tube 12 outside the socket member 14 to define the support portion 40 with the wire extending axially along the tube 12 from the coil 40 to define the arms 42 extending axially into the socket member 14 and then extends transversely to the arms 42 to define the circular abutments 38 disposed within the socket member 14. An undulation 46 is disposed in each of the circular abutments 38 and extends radially inwardly from the circular periphery thereof. The arms 42 are disposed opposite to one another on the same side of the coil 40 and are flared outwardly from the axis of the tube 12.

Figure 4:
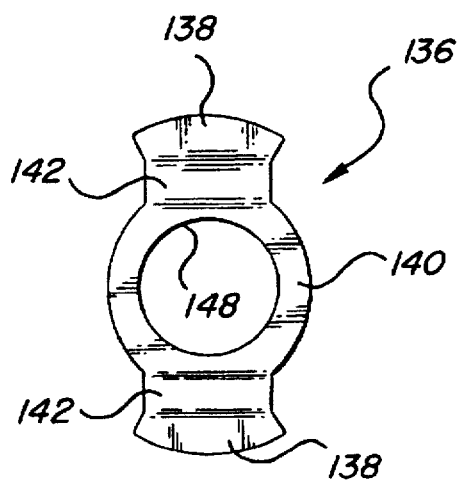
FIG. 4 is an end view of a second embodiment of the quick disconnect member of the subject invention.
Figure 5:
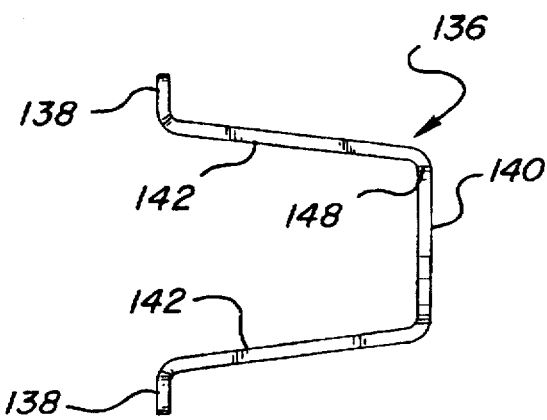
FIG. 5 is a side view of the embodiment of FIG. 4.

In the embodiment of FIGS. 4 and 5, corresponding portions are indicated with like numerals as in the first embodiment but increased by one hundred and the quick connect member 136 is defined by sheet metal stamped or otherwise formed into a U-shape having a base 140 defining the support portion, also to be disposed outside the socket member 14. The base 140 has an opening 148 therein through which the tube 12 extends. Additionally, the arms 142 are disposed diametrically opposite to one another, i.e., 180 degrees apart, and are flared outwardly from the axis of the tube 12. The base 140 defines a circular periphery extending between the arms 142 as the base 140 is viewed in plan in FIG. 4, i.e., an end view of the member 136. The abutments 138 also present circular peripheries disposed radially outwardly of the arms 142 and facing the base 140. The arms 142 act as cantilever springs which flex inwardly to move the abutments 138 into the socket 14 and bias the abutments 138 into the groove when in the locked position to retain the tube 12 in the socket 14.

In the embodiment of FIG. 7, corresponding portions are indicated with like numerals as in the previous embodiments but increased by two hundred and the quick connect member 236 is defined by either wire, strip or sheet metal stamped or otherwise formed into a U-shape having a base 240 formed like a washer defining the support portion, also disposed outside the socket member 14. The base 240 has an opening 248 therein through which the tube 12 extends. Additionally, the arms 242 are disposed diametrically opposite to one another, i.e., 180 degrees apart. The base 240 defines a circular periphery extending between the arms 242 as the base 240 is viewed in plan in, i.e., an end view of the member 236. The abutments 238 also present cam-like projections facing the base 240. The arms 242 extend into the socket member 14 and act as cantilever springs to flex inwardly with flexing and biasing action also provided by a spring loaded connection between the abutments 238 and the arms 242 for biasing the abutments 238 radially outwardly and into engagement with the groove 28. A tab 250 extends from each of the abutments 238 back to the exterior of the socket 14 for moving the abutments 238 radially inwardly to clear the shoulder 28 for insertion and removal from the socket 14. In other words, the tabs 250, through the connection thereof to the cantilevered spring arms 242 and because the arms 242 act as cantilevered springs, are biased radially outwardly to force the V-shaped abutments 338 into the groove 28. Each of the tabs 250 includes an undulation 252 extending inwardly from the abutment 238 and around the shoulder 28 and into an axially extending lever portion. The radially outwardly biasing or spring action between the arm 242 and the abutment 238 also causes the ramp side of the abutment 238 which joins the undulation 252 to be biased into engagement with the shoulder 28 to urge the projection 18 axially into the socket 14. In other words, because the undulations present a ramp surface acting against the interior of the shoulder 28, and particularly because the shoulder 28 is circular and the ramp between the apex of the abutment 238 and the apex of the undulation 252 is flat, the member 236 is urged axially into the socket 14. A washer 244 is disposed between the projection 18 of the tube 12 and the abutment 238 for transmitting this biasing force from the member 236 to urge the end 16 of the tube 12 against the tube seat 24 in response to the axial biasing reaction between the undulation 252 and the shoulder 28.

As will be appreciated, the tabs 250 are manually squeezed together from the outside of the socket member 14 to move the abutments 238 together and into the socket 14 and are thereafter released to bias the abutments 238 into the groove when in the locked position to retain the tube 12 in the socket 14. The washer, as alluded to above, may be of various materials, such as stainless steel, other metals, or plastic.

Accordingly, all embodiments include an annular support portion 40, 140 and 240 for surrounding an axis of the quick disconnect member 36, 136 and 236 with axially extending arms 42, 142 and 242 supporting abutments 38, 138 and 238 which face the support portions 40, 140, 240 and are biased into mechanical interlocking engagement with the groove 28 of the socket 14 by either the cantilevered spring arms 42 and 142 and/or the spring connection between the arms 242 and the abutments 238. In either case, the arms 42, 142, 242 are inherently spring loaded to a neutral position in which they extend along the tube 12 from the support portion for insertion into the socket member 14 ahead of the support portion 40, 140 and 240.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A coupling assembly (10) for connecting a tube to a socket, said assembly (10) comprising a socket member (14) defining a female socket;

a tube (12) having an end (16) disposed in said socket and presenting a radially extending projection (18);

said socket member (14) presenting a radially extending shoulder (28);

said projection (18) being disposed into said socket in spaced relationship to said shoulder (28);

said assembly characterized by a quick disconnect member (36, 136, 236) including a support portion (40, 140, 240) surrounding said tube (12) and in sliding engagement with said tube (12) outside of said socket member (14) and at least one arm (42, 142, 242) extending axially along said tube (12) and into said socket member (14) to a distal end axially displaced from said support portion (40, 140, 240), an abutment (38, 138, 238) facing said support portion (40, 140, 240) and disposed at said distal end and biased radially outwardly into a locked position in overlapping engagement with said shoulder (28) to sandwich said projection (18) into said socket on the opposite side of said abutment (38, 138, 238) from said arm (42, 142, 242) thereby mechanically preventing removal of said projection (18) and said tube (12) from said socket.

2. An assembly as set forth in claim 1 including a pair of said arms (42, 142, 242) cantilevered from said support portion (40, 140, 240), said abutments (38, 138, 238) being disposed radially outwardly of said shoulder (28) and facing said support portion (40, 140, 240) whereby said support portion (40, 140, 240) may be moved along said tube (12) as said abutments (38, 138, 238) are moved radially inwardly toward the tube (12) to clear said shoulder (28) during movement into said socket and released biased into mechanical interlocking engagement with said shoulder (28).

3. An assembly as set forth in claim 2 wherein said shoulder (28) is defined by an annular groove (28) in said socket.

4. An assembly as set forth in claim 3 including a seal (34) extending annularly about said tube (12) between said projection (18) and said end (16) of said tube (12) for sealing said tube (12) in said socket.

5. An assembly as set forth in claim 4 wherein said socket includes a tube counterbore (23) presenting a radial tube seat (24) and said end (16) of said tube (12) is seated against said tube seat (24).

6. An assembly as set forth in claim 5 including axial biasing means (44) disposed between said projection (18) of said tube (12) and said abutment (38, 138) for biasing said end (16) of said tube (12) against said tube seat (24).

7. An assembly as set forth in claim 6 wherein said axial biasing means (44) comprises at least one Belleville-type washer.

8. An assembly as set forth in claim 5 wherein said socket includes an entry counterbore (26), said annular groove (28) being disposed along said entry counterbore (26), said projection (18) being radially smaller than said tube counterbore (23) for allowing said projection (18) to move into said tube counterbore (23).

9. An assembly as set forth in claim 8 wherein said end (16) of said tube (12) is enlarged a degree equal to said projection (18) to define a seal saddle therebetween with said seal (34) disposed therein.

10. An assembly as set forth in claim 3 wherein each of said abutments (38, 138) presents a portion of a circular periphery complementary to said groove (28).

11. An assembly as set forth in claim 10 wherein said quick connect member (36) is defined by a coil of wire coiled about said tube (12) to define said support portion (40) with said wire extending axially along said tube (12) from said coil to define said arms (42) and then extends transversely to said arms (42) to define said abutments (38).

12. An assembly as set forth in claim 11 including an undulation (46) in each of said abutments (38) extending radially inwardly from said circular periphery thereof.

13. An assembly as set forth in claim 12 wherein said arms (42) are disposed opposite to one another on the same side of said coil (40).

14. An assembly as set forth in claim 10 wherein said quick connect member (136) is defined by sheet metal in a U-shape having a base (140) defining said support portion, said base (140) having an opening (148) therein through which said tube (12) extends.

15. An assembly as set forth in claim 14 wherein said arms (142) are disposed diametrically opposite to one another.

16. An assembly as set forth in claim 15 wherein said base (140) defines a circular periphery extending between said arms (142) as said base is viewed in plan.

17. An assembly as set forth in claim 3 wherein said arms (42, 142) are cantilevered spring arms spring loaded to a neutral position in which they extend along said tube (12) and flexed inwardly to insert said abutments (38, 138) into said groove (28) and bias said abutments (38, 138) into said groove (28).

18. An assembly as set forth in claim 3 including a tab (250) extending from each of said abutments (238) to the exterior of said socket for moving said abutments radially inwardly to clear said shoulder (28) for insertion and removal from said socket (14).

19. An assemble as set forth in claim 18 wherein each of said tabs (250) includes an undulation (252) extending inwardly from said abutment (238) and around said shoulder (28) and into an axially extending lever portion.

20. An assembly as set forth in claim 19 including a ramp section between said abutment (238) and said undulation (252) biased into engagement with said shoulder (28) to urge said projection (18) axially into said socket.

21. An assembly as set forth in claim 20 including a spring loaded connection between each of said arms (242) and the associated abutment (238) for biasing said abutments radially outwardly and into engagement with said groove (28).

22. An assembly as set forth in claim 21 wherein said socket includes a tube counterbore (23) presenting a radial tube seat (24) and said end (16) of said tube (12) is seated against said tube seat (24), including a washer (244) disposed between said projection (18) of said tube (12) and said abutment (238) for urging said end (16) of said tube (12) against said tube seat (24) in response to said biasing by said undulation (252).

\* \* \* \* \*